(12) United States Patent  
Perisic et al.

(10) Patent No.: US 9,211,806 B2  
(45) Date of Patent: Dec. 15, 2015

(54) METHODS, SYSTEMS AND APPARATUS FOR GENERATING VOLTAGE COMMANDS USED TO CONTROL OPERATION OF A PERMANENT MAGNET MACHINE

(75) Inventors: Milun Perisic, Cypress, CA (US); Silva Hiti, Redondo Beach, CA (US); Gabriel Gallegos-Lopez, Lomita, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 685 days.

(21) Appl. No.: 13/453,705

(22) Filed: Apr. 23, 2012

(65) Prior Publication Data

US 2013/0278182 A1    Oct. 24, 2013

(51) Int. Cl.
  *H02P 21/00*    (2006.01)
  *B60L 15/02*    (2006.01)

(52) U.S. Cl.
  CPC .......... *B60L 15/025* (2013.01); *H02P 21/0035* (2013.01); *H02P 2207/05* (2013.01); *Y02T 10/643* (2013.01)

(58) Field of Classification Search
  USPC ............. 318/400.02, 400.22, 400.33, 400.07, 318/400.15, 629, 808, 812
  See application file for complete search history.

(56) References Cited

U.S. PATENT DOCUMENTS

| 7,622,877 | B2 * | 11/2009 | Schulz et al. | ................ 318/432 |
| 8,339,094 | B2 * | 12/2012 | Perisic et al. | ................ 318/810 |
| 2008/0061728 | A1 | 3/2008 | Tomigashi | |
| 2008/0224649 | A1 | 9/2008 | Bae et al. | |
| 2008/0224651 | A1 * | 9/2008 | Schulz et al. | ................ 318/812 |
| 2011/0127933 | A1 | 6/2011 | Shimada et al. | |
| 2011/0133678 | A1 | 6/2011 | Tomigashi | |
| 2012/0187876 | A1 * | 7/2012 | Perisic et al. | ............ 318/400.02 |

OTHER PUBLICATIONS

Chinese Patent and Trademark Office, Office Action for Chinese Patent Application 201310142169.6, mailed Mar. 23, 2015.
German Patent and Trademark Office, Office Action for German Patent Application 102013205962.0, mailed May 20, 2015.

* cited by examiner

*Primary Examiner* — Eduardo Colon Santana  
*Assistant Examiner* — Iftekhar Mustafa  
(74) *Attorney, Agent, or Firm* — Ingrassia Fisher & Lorenz, P.C.

(57) ABSTRACT

Embodiments of the present disclosure relate to methods, systems and apparatus for generating voltage commands used to control operation of a permanent magnet machine.

20 Claims, 3 Drawing Sheets

METHODS, SYSTEMS AND APPARATUS FOR GENERATING VOLTAGE COMMANDS USED TO CONTROL OPERATION OF A PERMANENT MAGNET MACHINE

TECHNICAL FIELD

The technical field generally relates to techniques for controlling the operation of multi-phase systems, and more particularly relates to methods, systems and apparatus for generating voltage commands used to control a permanent magnet machine.

BACKGROUND

Electric machines are utilized in a wide variety of applications. For example, hybrid/electric vehicles (HEVs) typically include an electric traction drive system that includes an alternating current (AC) electric machine that is driven by a power converter with a direct current (DC) power source, such as a storage battery. Machine windings of the AC electric machine can be coupled to inverter sub-modules of a power inverter module (PIM). Each inverter sub-module includes a pair of switches that switch in a complementary manner to perform a rapid switching function to convert the DC power to AC power. This AC power drives the AC electric machine, which in turn drives a shaft of the HEV's drivetrain.

As used herein, the term "multi-phase" refers to two or more phases, and can be used to refer to electric machines that have two or more phases. A multi-phase electric machine typically includes a multi-phase pulse width modulated (PWM) inverter module that drives one or more multi-phase AC machine(s). One example of such a multi-phase electric machine is a three-phase permanent magnet AC machine. In a three-phase system, a three-phase PWM inverter module drives one or more three-phase permanent magnet AC machine(s). For example, some traditional HEVs implement two three-phase PWM inverter modules and two three-phase permanent magnet AC machines each being driven by a corresponding one of the three-phase PWM inverter modules that it is coupled to.

In many conventional motor drive systems, the inverter modules are driven by switching vector signals that are generated based on voltage command signals. For example, in a conventional motor drive system that relies on closed loop current control techniques, these voltage command signals can be generated based on feedback or measured stator currents and current commands that are processed by a current regulator. To explain further, stator currents (Ia-Ic) from a machine are sensed, sampled, and transformed into synchronous reference frame currents. In addition, a torque-to-current mapping module generates current commands. A conventional torque-to-current mapping module is implemented using a set of lookup tables (LUTs) that are stored in memory (e.g., ROM). In such systems, the torque-to-current mapping module receives a torque command signal (Te*), an angular rotation speed ($\omega r$) of the machine, and a DC input voltage ($V_{DC}$) as inputs, and maps these inputs to current commands that will ideally cause the machine to generate the commanded torque (Te*) at a given machine speed ($\omega r$). The synchronous reference frame currents and current commands are then processed at a current regulator to generate synchronous reference frame voltage command signals, which can then be transformed again, into stationary reference frame voltage command signals.

As such, these closed loop current control techniques rely on feedback, sensed or measured stator currents to generate voltage command signals that are needed to control the torque produced by the machine. However, in many situations, these closed loop current control techniques are not adequate or have to be modified. This can happen, for example, when one or more of the current sensors used to measure/sense stator currents are unavailable (e.g., when they fail or are known to be unreliable). In such situations, the feedback stator currents that are utilized in closed loop current control are not available, and therefore closed loop current control cannot be utilized to control the system.

However, it may be desirable to allow the operator of the vehicle to continue to drive the vehicle. This is sometimes referred to as a "limp home operating mode." The electric machine(s) used to drive the electric vehicle can be operated with limited speed and torque ranges (that are less than would otherwise be normally available) such that the maximum speed of the machine and the maximum torque that can be produced by the machine are limited within restricted ranges.

It would be desirable to provide improved methods, systems and apparatus for mapping torque commands to generate voltage commands used to control a multi-phase permanent magnet machine. Other desirable features and characteristics of the present invention will become apparent from the subsequent detailed description and the appended claims, taken in conjunction with the accompanying drawings and the foregoing technical field and background.

SUMMARY

Embodiments of the present disclosure relate to methods, systems and apparatus for controlling operation of a permanent magnet machine in a machine drive system.

In accordance with one of the disclosed embodiments, a method is provided for generating voltage command signals for controlling a permanent magnet machine. In accordance with the method a pair of synchronous reference frame voltage command signals are generated at a processor based on inputs comprising a torque command signal, an angular rotation speed of the permanent magnet machine, and a DC input voltage. The pair of synchronous reference frame voltage command signals (also referred to as d-axis and q-axis voltage command signals) that are generated depends on whether a first selection signal or a second selection signal is generated. For example, in response to the first selection signal, a d-axis voltage command signal and a q-axis voltage command signal can be generated. The d-axis voltage command signal and the q-axis voltage command signal are updated at a first rate. By contrast, in response to the second selection signal, a modified d-axis voltage command signal and a modified q-axis voltage command signal can be generated. The modified d-axis voltage command signal and the modified q-axis voltage command signal are computed and updated at both the first rate and a second rate. The first rate is a relatively slower rate and the second rate is a relatively faster rate than the first rate.

DESCRIPTION OF THE DRAWINGS

Embodiments of the present disclosure will hereinafter be described in conjunction with the following drawing figures, wherein like numerals denote like elements.

DESCRIPTION OF EXEMPLARY EMBODIMENTS

Figure 1:
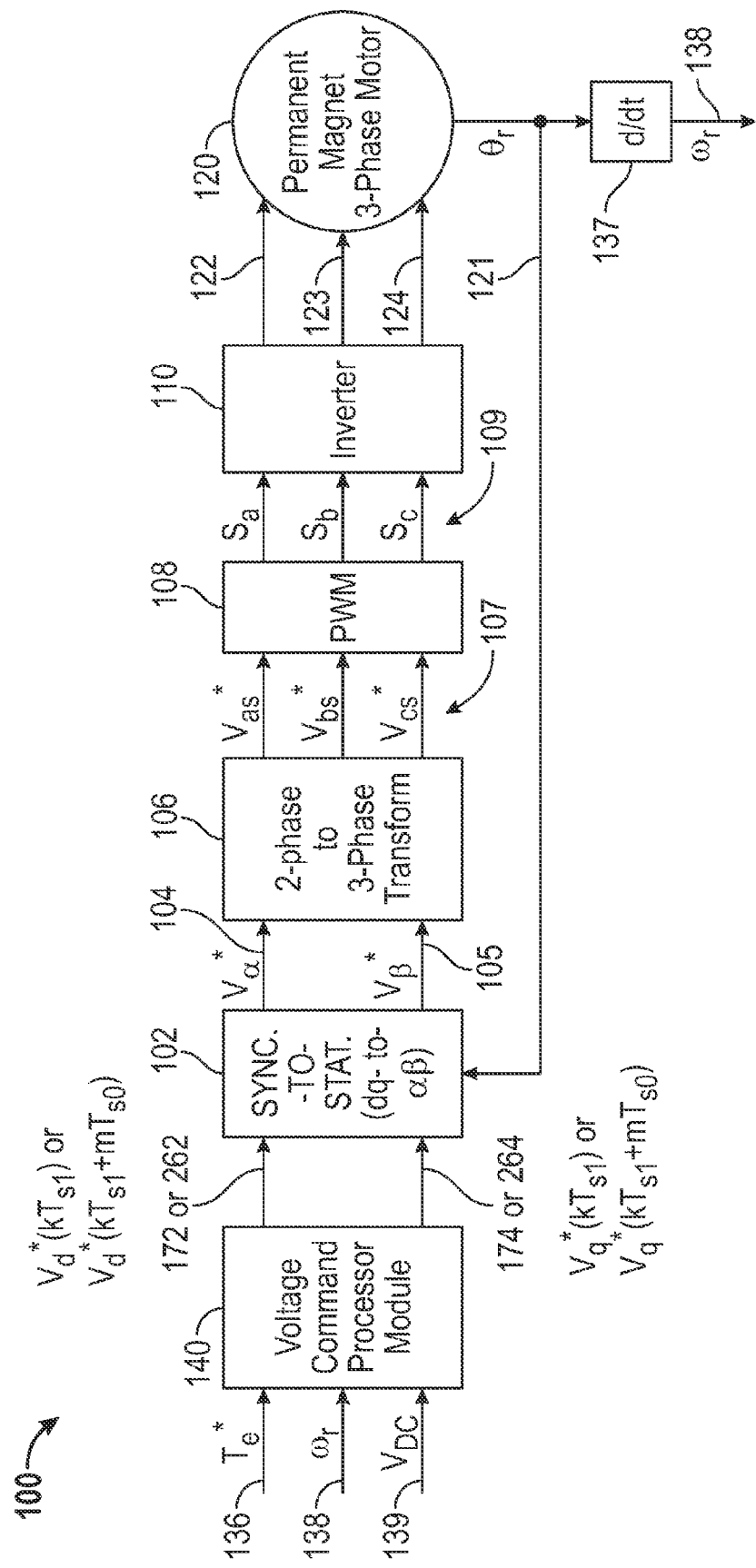
FIG. 1 is a block diagram of one example of a permanent magnet machine drive system in accordance with some of the disclosed embodiments.

As used herein, the word "exemplary" means "serving as an example, instance, or illustration." The following detailed description is merely exemplary in nature and is not intended to limit the disclosure or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the disclosure and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to generating voltage commands used for controlling operation of a multi-phase system. It will be appreciated that embodiments of the disclosure described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the disclosure described herein may be comprised of one or more conventional processors and unique stored program instructions that control the one or more processors to implement, in conjunction with certain non-processor circuits, some, most, or all of the functions for generating voltage commands used for controlling operation of a multi-phase system, as described herein. As such, these functions may be interpreted as steps of a method for generating voltage commands used for controlling operation of a multi-phase system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions will be described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

Embodiments of the present disclosure relate to methods, systems and apparatus for generating voltage commands used for controlling operation of a multi-phase system. In one exemplary implementation, the multi-phase permanent magnet machine can be implemented in operating environments such as a hybrid/electric vehicle (HEV). In the exemplary implementations which will now be described, the control techniques and technologies will be described as applied to a hybrid/electric vehicle. However, it will be appreciated by those skilled in the art that the same or similar techniques and technologies can be applied in the context of other systems in which it is desirable to generate voltage commands used for controlling operation of a multi-phase system when the multi-phase permanent magnet machine is operating in a limited mode. In this regard, any of the concepts disclosed here can be applied generally to "vehicles," and as used herein, the term "vehicle" broadly refers to a non-living transport mechanism having an AC machine. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

As used herein, the term "alternating current (AC) machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPMMs) and interior permanent magnet machines (IPMMs). In this application, embodiments are described in which the machine is a permanent magnet machine. By contrast, asynchronous AC machines include induction machines.

Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC machine is an electric machine that is driven by an alternating current. In some implementations, an AC machine includes an outside stationary stator having coils supplied with alternating current to produce a rotating magnetic field, and an inside rotor attached to the output shaft that is given a torque by the rotating field. Depending on the type of rotor used, AC machines can be classified as synchronous or asynchronous.

FIG. 1 is a block diagram of one example of a permanent magnet machine drive system 100 in accordance with the disclosed embodiments. The system 100 controls a three-phase permanent magnet AC machine 120 via a three-phase pulse width modulated (PWM) inverter module 110 coupled to the three-phase permanent magnet AC machine 120 so that the three-phase permanent magnet AC machine 120 can efficiently use a DC input voltage (Vdc) 139 provided to the three-phase PWM inverter module 110 generating voltage commands that are used to control the three-phase permanent magnet AC machine 120. In one particular implementation, the vector controlled permanent magnet machine drive system 100 can be used to control torque in an HEV.

In the following description of one particular non-limiting implementation, the three-phase permanent magnet AC machine 120 is embodied as a three-phase AC powered machine 120, and in particular a three-phase, permanent magnet synchronous AC powered motor (or more broadly as a machine 120); however, it should be appreciated that the illustrated embodiment is only one non-limiting example of the types of AC permanent magnet machines that the disclosed embodiments can be applied to, and further that the disclosed embodiments can be applied to any type of multiphase AC permanent magnet machine that includes fewer or more phases.

The three-phase AC permanent magnet machine 120 is coupled to the three-phase PWM inverter module 110 via three inverter poles and generates mechanical power (Torque×Speed) based on three-phase sinusoidal current signals 122 ... 124 received from the PWM inverter module 110. In some implementations, the angular position 121 of a rotor (θr) of the three-phase AC permanent magnet machine 120 or "shaft position" is measured using a position sensor (not illustrated), and in other implementations, the angular position 121 of a rotor (θr) of the three-phase AC permanent magnet machine 120 can be estimated without using a position sensor by using sensorless position estimation techniques.

The permanent magnet machine drive system 100 includes a voltage command processor module 140, a synchronous-to-stationary (SYNC.-TO-STAT.) transformation module 102, an αβ reference frame-to-abc reference frame (αβ-to-abc) transformation module 106, a pulse width modulation (PWM) module 108, and a three-phase PWM inverter 110. Although not shown, other conventional modules such as an abc reference frame-to-αβ reference frame (abc-to-αβ) transformation module, and a stationary-to-synchronous (STAT.-TO-SYNC.) transformation module can be present. However, in some operational scenarios in which the disclosed embodiments can be implemented (e.g. when one or more current sensor(s) fail or produce unreliable output information), there is no way to sense and sample stator currents (Ia-Ic) 122-124 and provide them to an abc-to-αβ transformation module. In the case where only one sensor fails, there is an option to estimate that sensor's current from the other two good currents. An algorithm can be used to detect a bad sensor so that it can be isolated from the system. However, such algorithms can be time consuming and/or not work well in certain current measurement failure modes. As such, other methodologies that will be described herein can be employed to control the permanent magnet machine 120.

The voltage command processor module 140 receives a torque command signal (Te*) 136, angular rotation speed (ωr) 138 of the shaft that is generated at block 137 based on the derivative of the rotor/shaft position output (θr) 121, and the DC input voltage ($V_{DC}$) 139 as inputs, along with possibly a variety of other system parameters depending upon implementation. The voltage command processor module 140 uses these inputs to generate (in the synchronous reference frame) either (1) a d-axis voltage command signal (Vd*($kT_{s1}$)) 172 and a q-axis voltage command signal (Vq*($kT_{s1}$)) 174, or (2) a modified d-axis voltage command signal (Vd*($kT_{s1}$+$mT_{s0}$)) 262 and a modified q-axis voltage command signal (Vq*($kT_{s1}$+$mT_{s0}$)) 264. The outputs of the voltage command processor module 140 will cause the permanent magnet machine 120 to generate the commanded torque (Te*) 136 at speed (ωr) 138. In particular, the voltage command processor module 140 uses the inputs to map the torque command signal (Te*) 136 to either (1) the d-axis voltage command signal (Vd*($kT_{s1}$)) 172 and the q-axis voltage command signal (Vq* ($kT_{s1}$)) 174, or (2) the modified synchronous reference frame d-axis voltage command signal (Vd*($kT_{s1}$+$mT_{s0}$)) 262 and the modified synchronous reference frame q-axis voltage command signal (Vq*($kT_{s1}$+$mT_{s0}$)) 264. At steady state, the synchronous reference frame d-axis and q-axis voltage command signals are DC commands that have a constant value as a function of time.

The synchronous-to-stationary transformation module 102 receives either (1) the synchronous reference frame d-axis voltage command signal (Vd*($kT_{s1}$)) 172 and the synchronous reference frame q-axis voltage command signal (Vq*) 174, or (2) the modified synchronous reference frame d-axis voltage command signal (Vd*($kT_{s1}$+$mT_{s0}$)) 262, and the modified synchronous reference frame q-axis voltage command signal (Vq*($kT_{s1}$+$mT_{s0}$)) 264 as inputs, along with the rotor position output (θr) 121, and performs a dq-to-αβ transformation to generate an α-axis stationary reference frame voltage command signal (Vα*) 104 and a β-axis stationary reference frame voltage command signal (Vβ*) 105. The stationary reference frame α-axis and β-axis voltage command signals (Vα*, Vβ*) 104, 105 are in the stationary reference frame and therefore have values that vary as a sine wave as a function of time. The process of synchronous-to-stationary conversion is well-known in the art and for sake of brevity will not be described in detail.

The αβ-to-abc transformation module 106 receives the stationary reference frame voltage command signals (Vα*, Vβ*) 104, 105, and based on these signals, generates stationary reference frame voltage command signals (Vas* ... Vcs*) 107 (also referred to as "phase voltage command signals") that are sent to the PWM module 108. The αβ-to-abc transformation is well-known in the art and for sake of brevity will not be described in detail.

The three-phase PWM inverter module 110 is coupled to the PWM module 108. The PWM module 108 is used for the control of PWM of the phase voltage command signals (Vas* ... Vcs*) 107. The switching vector signals (Sa ... Sc) 109 are generated based on duty cycle waveforms internally generated by the PWM module 108 to have a particular duty cycle during each PWM period. The PWM module 108 modifies the phase voltage command signals (Vas* ... Vcs*) 107 based on the duty cycle waveforms (not illustrated in FIG. 1) to generate switching vector signals (Sa ... Sc) 109, which it provides to the three-phase PWM inverter module 110. The particular modulation algorithm implemented in the PWM module 108 can be any known modulation algorithm including Space Vector Pulse Width Modulation (SVPWM) techniques to control of pulse width modulation (PWM) to create alternating current (AC) waveforms that drive the three-phase AC powered permanent magnet machine 120 at varying speeds based on the DC input 139.

The switching vector signals (Sa ... Sc) 109 control the switching states of switches in PWM inverter 110 to generate three-phase voltage commands at each phase A, B, C. The switching vector signals (Sa ... Sc) 109 are PWM waveforms that have a particular duty cycle during each PWM period that is determined by the duty cycle waveforms that are internally generated at the PWM module 108.

The three-phase PWM inverter module 110 receives the DC input voltage (Vdc) and switching vector signals (Sa ... Sc) 109, and uses them to generate three-phase alternating current (AC) voltage signal waveforms at inverter poles that drive the three-phase permanent magnet AC machine 120 at varying speeds (ωr) 138.

The three-phase permanent magnet machine 120 receives the three-phase voltage signals generated by the PWM inverter 110 and generates a machine output at the commanded torque Te* 136.

Although not illustrated in FIG. 1, the system 100 may also include a gear coupled to and driven by a shaft of the three-phase permanent magnet AC machine 120.

Figure 2:
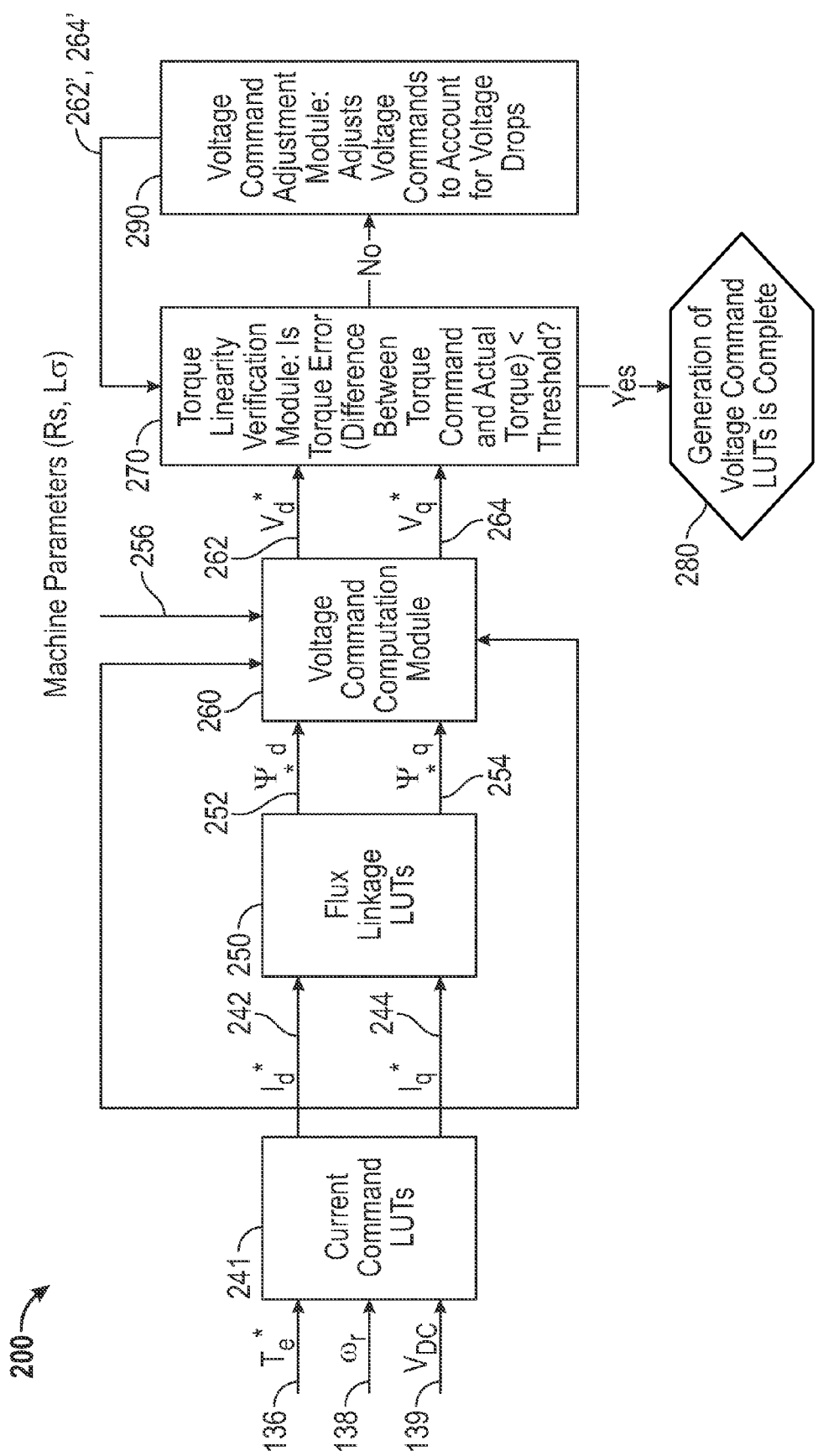
FIG. 2 is a block diagram that illustrates a method for computing voltage command lookup tables in accordance with one exemplary implementation of some of the disclosed embodiments.

FIG. 2 is a block diagram that illustrates a method 200 for computing the voltage command lookup tables in accordance with one exemplary implementation of some of the disclosed embodiments. As will be explained below, the method 200 of FIG. 2 utilizes current command lookup tables 241, flux linkage lookup tables 250, a voltage command computation module 260, a torque linearity verification module 270, and a voltage command adjustment module 290 to generate voltage command lookup tables at 280.

The current command lookup tables 241 receive torque command signal (Te*) 136, angular rotation speed (ωr) 138, and DC input voltage ($V_{DC}$) 139, and processes inputs to generate d-axis current command (Id*) 242 and q-axis current command (Iq*) 244. The d-axis current command (Id*) and the q-axis current command (Iq*) 142, 144 are designed to cause the PM permanent magnet machine (120 in FIG. 1) to generate the commanded torque (Te*) at the angular rotation speed (ωr) 138.

The flux linkage lookup tables 250 processes d-axis current command (Id*) 242 and q-axis current command (Iq*) 244 to generate expected d-axis flux (Ψd*) 252 and expected q-axis flux (Ψq*) 254.

The voltage command computation module 260 processes the d-axis current command (Id*) 242, the q-axis current command (Iq*) 244, the expected d-axis flux (Ψd*) 252, the expected q-axis flux (Ψq*) 254 and machine parameters 256 (such as stator resistance (Rs) and leakage inductance (Lσ)) to compute d-axis and q-axis voltage command signals (Vd*, Vq*) 262, 264. In one embodiment, the voltage command computation module 260 computes these d-axis and q-axis voltage command signals (Vd*,Vq*) 262, 264 based on an equations (1A and 1B) as follows:

$$V_d^* = R_s I_d^* - \omega_r P(\Psi_q(I_d^*, I_q^*) + L_\sigma I_q^*) \quad (1A)$$

$$V_q^* = R_s I_q^* + \omega_r P(\Psi_d(I_d^*, I_q^*) + L_\sigma I_d^*) \quad (1B),$$

where Rs is the stator resistance, P is the number of pole pairs, Lσ is leakage inductance, and the other variables are described above.

The torque linearity testing module 270 processes the d-axis and q-axis voltage command signals (Vd*,Vq*) 262, 264 to determine a torque error, which can be computed by comparing actual torque generated to the torque command signal (Te*) 136. The torque linearity testing module 270 then compares the torque error to a linearity threshold. When the torque linearity testing module 270 determines that the torque error is less than or equal to the linearity threshold, method 200 proceeds to 280 where the generation of the voltage command lookup tables (not illustrated in FIG. 2, but shown as 240 in FIG. 3) is deemed to be complete.

By contrast, when the torque linearity testing module 270 determines that the torque error is greater than the linearity threshold, method 200 proceeds to voltage command adjustment module 290 where voltage commands 262, 264 are adjusted to account for factors such as voltage drops. The goal this adjustment is to adjust the adjusted voltage commands 262', 264' so that the actual torque that is produced will match the torque command signal (Te*) 136. The adjusted voltage commands 262', 264' generated by voltage command adjustment module 290 are then fed back to torque linearity testing module 270, which again uses these adjusted voltage commands 262', 264' to determine whether or not the torque error is within or outside of linearity threshold. When the torque error is determined to be outside the linearity threshold, the voltage commands continue to be adjusted at voltage command adjustment module 290 until the torque error falls within acceptable linearity limits. When the torque error falls within acceptable linearity limits, the voltage command LUTs 240 are "ready for use" at the voltage command processor module 140. The voltage command LUTs 240 are used to map a particular DC link voltage, a particular value of the torque command signal (Te*) 136, a particular value of the angular rotation speed (ωr) 138, and a particular value of the DC input voltage ($V_{DC}$) 139 to corresponding voltage commands. In one embodiment, a particular DC link voltage can be used to select one or two of the voltage command LUTs 240. The two selected voltage command LUTs 240 can then be used to determine values for the voltage commands, that can then be interpolated to generate resultant voltage commands that are needed to cause the permanent magnet machine to generate the particular value of the torque command signal (Te*) 136 at the particular value of the angular rotation speed (ωr) 138 given the particular DC link voltage. The interpolation processing is known in the art and for sake of brevity will not be described in detail herein.

Once the voltage command lookup tables 240 have been generated, they can then be used at the voltage command processor module 140, as will now be described below with reference to FIG. 3.

Figure 3:
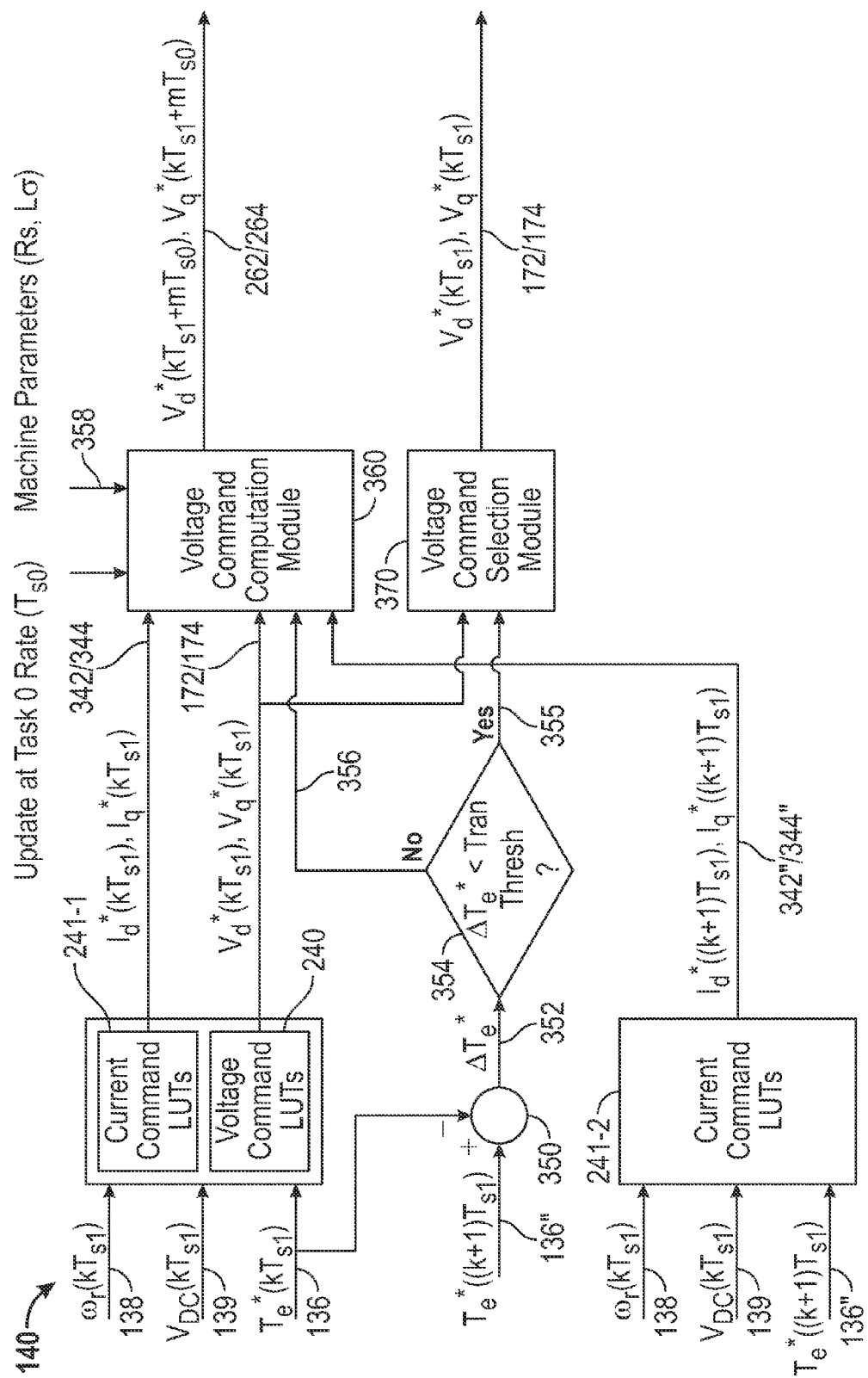
FIG. 3 is a block diagram that illustrates one exemplary implementation of a voltage command processor module in accordance with some of the disclosed embodiments.

FIG. 3 is a block diagram that illustrates one exemplary implementation of a voltage command processor module 140 in accordance with one exemplary implementation of some of the disclosed embodiments.

In this embodiment, the voltage command processor module 140 includes voltage command lookup tables 240, two instances of the current command lookup tables 241, a transient computation module 350, a transient testing module 354, a modified voltage command computation module 360, and a voltage command selection module 370.

The voltage command lookup tables 240 and a first set of the current command lookup tables 241-1 receive the torque command signal (Te*(kT$_{s1}$)) 136, the angular rotation speed (ωr(kT$_{s1}$)) 138, the DC input voltage ($V_{DC}$(kT$_{s1}$)) 139 as inputs. These signals are received at a first rate corresponding to a first period (T$_{s1}$) (e.g., a Task1 rate). In comparison to a second rate (corresponding to a second period (T$_{s0}$)), the first rate is a relatively slow or intermediate rate that can occur, in one exemplary implementation, once every approximately every 2 milliseconds. Here, the variable k is a first index associated with the first rate, and the first rate corresponds to a relatively slower frequency (1/T$_{s1}$) processing. The first index (k) can range from 1 to infinity. The voltage command lookup tables 240 and the first set of the current command lookup tables 241-1 are illustrated in one block since they receive the same inputs.

The voltage command lookup tables 240 process these inputs to generate the d-axis voltage command signal (Vd*(kT$_{s1}$)) 172, and the q-axis voltage command signal (Vq*(kT$_{s1}$)) 174.

The first set of current command lookup tables 241-1 process these inputs to generate the first d-axis current command signal (Id*(kT$_{s1}$)) 342, and the first q-axis current command signal (Iq*(kT$_{s1}$)) 344.

In addition an identical, second set of the current command lookup tables 241-2 are provided. Similar to the first set of the current command lookup tables 241-1, the second set of the current command lookup tables 241-2 receive the torque command signal Te*((k+1)T$_{s1}$) 136", the angular rotation speed (ωr(kT$_{s1}$)) 138, and the DC input voltage ($V_{DC}$(kT$_{s1}$)) 139 as inputs at the first rate (e.g., a Task1 rate). The only difference is that the torque command signal Te*((k+1)T$_{s1}$) 136 is one first rate sampling time after the torque command signal Te*(kT$_{s1}$) that is processed by the first set of the current command lookup tables 241-1. To differentiate between these signals in the remainder of this application, the torque command signal Te*(kT$_{s1}$) will be referred to as a first torque command signal Te*(kT$_{s1}$), and the other torque command signal Te*((k+1)T$_{s1}$) will be referred to as a second torque command signal Te*((k+1)T$_{s1}$). The second torque command signal Te*((k+1)T$_{s1}$) 136" is shifted by one first rate sampling time with respect to the first torque command signal Te* (kT$_{s1}$) 136.

As such, the second set of current command lookup tables 241-2 process these inputs to generate a second d-axis current command signal (Id*(k+1)T$_{s1}$)) 342", and a second q-axis current command signal (Iq*(k+1)T$_{s1}$)) 344". The second d-axis current command signal (Id*(k+1)T$_{s1}$)) 342" is shifted by one first rate sampling time with respect to the first d-axis current command signal (Id*(kT$_{s1}$)) 342, and the second q-axis current command signal (Iq*(k+1)T$_{s1}$)) 344" is shifted by one first rate sampling time with respect to the first q-axis current command signal (Iq*(kT$_{s1}$)) 344.

The transient computation module 350 receives the first torque command signal Te*(kT$_{s1}$) 136, and the second torque command signal Te*((k+1)T$_{s1}$) 136", and determines the difference between them to generate a difference signal 352 that represents a series of torque transient values (ΔTe*) each representing the difference between the second torque command signal Te*((k+1)T$_{s1}$) 136" and the first torque command signal Te*(kT$_{s1}$) 136.

At transient testing module 354, each torque transient value (ΔTe*) of the difference signal 352 is compared to a transient threshold (which can be zero in one implementation).

Whenever a torque transient value (ΔTe*) (of the difference signal 352) is determined to be less than or equal to the transient threshold, a first selection signal 355 is generated to select the voltage command selection module 370 as the source that will output the voltage commands. In one embodiment, the voltage command selection module 370 receives the d-axis voltage command signal (Vd*(kT$_{s1}$)) 172, and the q-axis voltage command signal (Vq*(kT$_{s1}$)) 174, and outputs them as the voltage command signals.

By contrast, whenever a torque transient value (ΔTe*) (of the difference signal 352) is determined to be greater than the transient threshold, a second selection signal 356 is generated to select the modified voltage command computation module 360 as the source that will be selected to generate the voltage commands. In one embodiment, the modified voltage command computation module 360 receives the d-axis voltage command signal (Vd*(kT$_{s1}$)) 172, the q-axis voltage command signal (Vq*(kT$_{s1}$)) 174, the first d-axis current command signal (Id*(kT$_{s1}$)) 342, the first q-axis current command signal (Iq*(kT$_{s1}$)) (Iq*) 344, the second d-axis current command signal (Id*(k+1)T$_{s1}$)) 342", the second q-axis current command signal (Iq*(k+1)T$_{s1}$)) 344", and the machine parameters 358, and processes these inputs to generate the modified d-axis voltage command signal (Vd*(kT$_{s1}$+mT$_{s0}$)) 262 and the modified q-axis voltage command signal (Vq* (kT$_{s1}$+mT$_{s0}$)) 264 (in the synchronous reference frame), which are updated at the second rate (e.g., the TASK0 rate) corresponding to a second period (T$_{s0}$). In comparison to the first rate (corresponding to the first period (T$_{s1}$)), the second rate is a relatively fast rate that corresponds to a relatively higher frequency (1/T$_{s0}$) processing and can occur, in one exemplary implementation, once every approximately every 0.1 milliseconds or 100 μsec). In one embodiment, the fast, second rate can be set equal to the PWM rate or switching frequency (f$_{SW}$), which can be in the range of 1 kHz to 20 kHz in some systems. In other systems the PWM rate is a higher multiple of the sample rate. Here, the variable m is a second index associated with the second rate. The second index (m) essentially specifies how many second rate events take place during each value of the first index (k) (e.g., that within a task one period there will be multiple task zero periods). The second index can range from 1 to 20 in one implementation. The significance of updating voltage commands at the faster, second rate versus updating at the slower first rate will be described below.

In one embodiment, the modified voltage command computation module 360 computes the modified d-axis voltage command signal (Vd*(kT$_{s1}$+mT$_{s0}$)) 262 and the modified q-axis voltage command signal (Vq*(kT$_{s1}$+mT$_{s0}$)) 264 based on an stator voltage vector (V$_s$*) equation (2) as follows:

$$V_s^*(kT_{s1} + mT_{s0}) = R_s I_s^*(kT_{s1} + mT_{s0}) + J\omega_e \Psi(kT_{s1} + mT_{s0}) + L_{ac}\frac{\Delta I_s^*(kT_{s1})}{T_{s0}} \quad (2)$$

where the second index (m) can be defined by the expression (3):

$$m \in \left[1, \text{int}\left(\frac{T_{s1}}{T_{s0}}\right)\right] \quad (3)$$

where the imaginary matrix (J) is defined by equation (4) as follows:

$$J = \begin{bmatrix} 0 & -1 \\ 1 & 0 \end{bmatrix} \quad (4)$$

where AC inductance (L$_{ac}$) is defined by equation (5) as follows $$L_{ac} = \begin{bmatrix} L_{dd} & L_{dq} \\ L_{dq} & L_{qq} \end{bmatrix} \quad (5)$$

where L$_{dd}$ is the d-axis AC inductance, where L$_{dq}$ is the AC cross-coupling inductance, where L$_{qq}$ is the q-axis AC inductance, and where a current difference (ΔI(kT$_{s1}$)) and a is defined by equation (6) as follows:

$$\Delta I_s^*(kT_{s1}) = \frac{I_s^*((k+1)T_{s1}) - I_s^*(kT_{s1})}{\text{int}\left(\frac{T_{s1}}{T_{s0}}\right)} \quad (6)$$

In equation (2), the voltage commands are updated and a function of both the faster, second rate (corresponding to the second period (T$_{s0}$) or task zero rate) and the slower, first rate (corresponding to the first period (T$_{s1}$) or task one rate) so that a slew rate can be provided.

Thus, in some operating conditions, the voltage commands can be updated a task zero rate which is much faster than the traditional task one rate at which the current commands are normally updated in a closed loop current control system. To explain further, during normal closed loop current control, the current commands are updated a task one rate (e.g., about every 2 ms). This has been found to be an adequate amount of time for the system to respond to previous current commands. However, with the open loop voltage control, updating voltage commands at this relatively slow task one rate can result in problems. For example it can cause torque oscillations which can in turn result vibrations are noise in the vehicle in which the permanent magnet machine is implemented. Thus, in an open loop voltage controlled system of the disclosed embodiments, the voltage commands can be updated much more often especially during certain operating conditions.

For example, in one implementation of the disclosed embodiments, the voltage commands are updated at a much faster task zero rate (which is equivalent to a PWM switching period, and far much smaller than every 2 ms). In other words, the voltage commands are calculated/updated multiple times (at the task zero rate) within a task one period. Thus, in accordance with the disclosed embodiments, the voltage commands are updated at a slew rate to avoid large step changes in the voltage commands so that the change is more linear, which helps avoid overshoots. This results in a smoother transition in less torque oscillations. As such, vibrations and noise generated by the permanent magnet machine can be reduced, which is a better user experience for the operator of the vehicle.

From a practical standpoint, if the driver steps on the accelerator to hard this will not result in an immediate jump or step response in terms of the voltage commands that are applied in the system to generate that torque. Instead, the voltage commands will be updated in accordance with a slew rate (that varies at the task zero rate) such that the commanded torque is produced over time in a more linear fashion Conclusion Thus, various embodiments have been described for generating voltage commands used for controlling operation of a multi-phase permanent magnet machine.

In accordance with the disclosed embodiments, open loop voltage control techniques are provided that can be used in conjunction with permanent magnet machines. In accordance with the disclosed embodiments, voltage commands are generated independently using a set of voltage command lookup tables. The disclosed embodiments can be useful, for example, when current sensors and a current feedback loop are not available.

Methods and apparatus are also provided for generating voltage command lookup tables. The voltage command LUTs of the present application are designed to produce voltage commands that would have normally been generated by a current controller given the three specific inputs for torque and speed and voltage that would normally be input to the current tables. In other words, the voltage command LUTs can be constructed to output voltage commands that would have been generated by a closed-loop current controlled system for a particular torque speed DC voltage inputs. This way the voltage command LUTs can mimic a current controlled system without having the current feedback.

The voltage command LUTs are initially calculated from stator voltage equations, and the resulting voltage commands can then be adjusted to ensure adequate accuracy. For example, the initial voltage commands can be adjusted experimentally to account for inverter nonlinearities by verifying torque linearity. In other words, the voltage commands are initially generated based on the voltage equations, and if, during the verification process, it is determined that the initial voltage command lookup tables are not producing the desired torque and speed, then additional modifications to the voltage commands can be made to account for the inverter nonlinearities so that the voltage commands that are output by the voltage command lookup tables will produce the desired torque and speed for given DC link voltage.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for generating voltage command signals for controlling a permanent magnet machine, the method comprising:
   generating a pair of synchronous reference frame voltage command signals at a processor based on inputs comprising a torque command signal (Te*), an angular rotation speed ($\omega r$) of the permanent magnet machine, and a DC input voltage ($V_{DC}$), wherein generating the pair of synchronous reference frame voltage command signals comprises:
      generating a d-axis voltage command signal (Vd*($kT_{s1}$)) and a q-axis voltage command signal (Vq*($kT_{s1}$)), wherein the d-axis voltage command signal (Vd*($kT_{s1}$)) and the q-axis voltage command signal (Vq*($kT_{s1}$)) are each updated at a first rate; and
      generating a modified d-axis voltage command signal (Vd*($kT_{s1}+mT_{s0}$)) and a modified q-axis voltage command signal (Vq*($kT_{s1}+mT_{s0}$)), wherein the modified d-axis voltage command signal (Vd*($kT_{s1}+mT_{s0}$)) and the modified q-axis voltage command signal (Vq*($kT_{s1}+mT_{s0}$)) are computed and updated at both the first rate and a second rate,
      wherein the first rate is a relatively slower rate and the second rate is a relatively faster rate than the first rate; and
   selecting, as the synchronous reference frame voltage command signals that are output to control the permanent magnet machine:
      the d-axis voltage command signal (Vd*($kT_{s1}$)) and the q-axis voltage command signal (Vq*($kT_{s1}$)) in response to a first selection signal that is generated whenever a torque transient value ($\Delta Te^*$) is less than or equal to a transient threshold; and
      the modified d-axis voltage command signal (Vd*($kT_{s1}+mT_{s0}$)) and the modified q-axis voltage command signal (Vq*($kT_{s1}+mT_{s0}$)) in response to a second selection signal that is generated whenever the torque transient value ($\Delta Te^*$) is greater than the transient threshold.

2. A method according to claim 1, wherein the step of generating comprises:
   receiving first inputs comprising: the first torque command signal Te*($kT_{s1}$), the angular rotation speed samples ($\omega r(kT_{s1})$), and the DC input voltage ($V_{DC}(kT_{s1})$), and
   applying the first inputs to a set of voltage command lookup tables to generate the d-axis voltage command signal (Vd*($kT_{s1}$)), and the q-axis voltage command signal (Vq*($kT_{s1}$)) at the first rate;
   computing torque transient values ($\Delta Te^*$) each representing a difference between the second torque command signal Te*($(k+1)T_{s1}$) and the first torque command signal Te*($kT_{s1}$), and comparing each torque transient value ($\Delta Te^*$) to the transient threshold;
   generating the first selection signal whenever one of the torque transient values ($\Delta Te^*$) is determined to be less than or equal to the transient threshold, and generating the second selection signal whenever one of the torque transient values ($\Delta Te^*$) is determined to be greater than the transient threshold; and
further comprising:
   outputting, as the synchronous reference frame voltage command signals:
      the d-axis voltage command signal (Vd*($kT_{s1}$)) and the q-axis voltage command signal (Vq*($kT_{s1}$)) in response to the first selection signal; and
      the modified d-axis voltage command signal (Vd*($kT_{s1}+mT_{s0}$)) and the modified q-axis voltage command signal (Vq*($kT_{s1}+mT_{s0}$)) in response to the second selection signal.

3. A method according to claim 2, further comprising:
   applying the first inputs to a first set of current command lookup tables to generate the first d-axis current command signal (Id*($kT_{s1}$)), and the first q-axis current command signal (Iq*($kT_{s1}$));
   receiving second inputs comprising: the second torque command signal Te*($(k+1)T_{s1}$), the angular rotation speed ($\omega r(kT_{s1})$), and the DC input voltage ($V_{DC}(kT_{s1})$), wherein the second torque command signal Te*($(k+1)T_{s1}$) is shifted by one first rate sampling time with respect to the first torque command signal Te*($kT_{s1}$); and
   applying the second inputs to a second set of current command lookup tables to generate a second d-axis current command signal (Id*($(k+1)T_{s1}$)), and a second q-axis current command signal (Iq*($(k+1)T_{s1}$)).

4. A method according to claim 3, wherein generating the modified d-axis voltage command signal (Vd*($kT_{s1}+mT_{s0}$)) and the modified q-axis voltage command signal (Vq*($kT_{s1}+mT_{s0}$)), comprises:
   processing the d-axis voltage command signal (Vd*($kT_{s1}$)), the q-axis voltage command signal (Vq*($kT_{s1}$)), the first d-axis current command signal (Id*($kT_{s1}$)), the first q-axis current command signal (Iq*($kT_{s1}$)), the second d-axis current command signal (Id*($(k+1)T_{s1}$)), and the second q-axis current command signal (Iq*($(k+1)T_{s1}$)) to compute the modified d-axis voltage command signal (Vd*($kT_{s1}+mT_{s0}$)) and the modified q-axis voltage command signal (Vq*($kT_{s1}+mT_{s0}$)).

5. A method according to claim 4, wherein the second d-axis current command signal (Id*($(k+1)T_{s1}$)) is shifted by one first rate sampling time with respect to the first d-axis current command signal (Id*($kT_{s1}$)), and wherein the second q-axis current command signal (Iq*($(k+1)T_{s1}$)) is shifted by one first rate sampling time with respect to the first q-axis current command signal ($Iq^*(kT_{s1})$).

6. A method according to claim 5, wherein the first rate corresponds to a relatively slower frequency processing, and wherein the second rate corresponds to a relatively higher frequency processing.

7. A method according to claim 6, wherein the first rate corresponds to a first period ($T_{s1}$) and wherein the second rate corresponds to a second period ($T_{s0}$), wherein there are multiple second periods during each first period.

8. A method according to claim 7, wherein the second rate is equal to a PWM rate or switching frequency ($f_{SW}$).

9. A method according to claim 7, wherein the modified d-axis voltage command signal ($Vd^*(kT_{s1}+mT_{s0})$) and the modified q-axis voltage command signal ($Vq^*(kT_{s1}+mT_{s0})$) are computed multiple times at the second rate during one of the first periods ($T_{s1}$) to avoid large step changes in the pair of synchronous reference frame voltage command signals such that commanded torque is produced over time in a more linear fashion than the synchronous reference frame d-axis voltage command signal ($Vd^*(kT_{s1})$) and the synchronous reference frame q-axis voltage command signal ($Vq^*$).

10. An open loop voltage control system for generating voltage command signals for controlling a permanent magnet machine, the system comprising:
a voltage command processor module receives inputs comprising a torque command signal ($Te^*$), an angular rotation speed ($\omega r$) of the permanent magnet machine, and a DC input voltage ($V_{DC}$), and that is configured to generate, based on the inputs, a pair of synchronous reference frame voltage command signals comprising:
 a d-axis voltage command signal ($Vd^*(kT_{s1})$) and a q-axis voltage command signal ($Vq^*(kT_{s1})$), wherein the d-axis voltage command signal ($Vd^*(kT_{s1})$) and the q-axis voltage command signal ($Vq^*(kT_{s1})$) are each updated at a first rate; and
 a modified d-axis voltage command signal ($Vd^*(kT_{s1}+mT_{s0})$) and a modified q-axis voltage command signal ($Vq^*(kT_{s1}+mT_{s0})$), wherein the modified d-axis voltage command signal ($Vd^*(kT_{s1}+mT_{s0})$) and the modified q-axis voltage command signal ($Vq^*(kT_{s1}+mT_{s0})$) are each computed and updated at both the first rate and a second rate, wherein the first rate is a relatively slower rate and the second rate is a relatively faster rate than the first rate; and
select, as the synchronous reference frame voltage command signals that are output to control the permanent magnet machine:
 the d-axis voltage command signal ($Vd^*(kT_{s1})$) and the q-axis voltage command signal ($Vq^*(kT_{s1})$) in response to a first selection signal that is generated whenever a torque transient value ($\Delta Te^*$) is less than or equal to a transient threshold; and
 the modified d-axis voltage command signal ($Vd^*(kT_{s1}+mT_{s0})$) and the modified q-axis voltage command signal ($Vq^*(kT_{s1}+mT_{s0})$) in response to a second selection signal that is generated whenever the torque transient value ($\Delta Te^*$) is greater than the transient threshold.

11. A system according to claim 10, wherein the voltage command processor module comprises:
a set of voltage command lookup tables that are configured to receive first inputs comprising: first torque command signal ($Te^*(kT_{s1})$), the angular rotation speed ($\omega r(kT_{s1})$), the DC input voltage ($V_{DC}(kT_{s1})$), and that are configured to generate the d-axis voltage command signal ($Vd^*(kT_{s1})$), and the q-axis voltage command signal ($Vq^*(kT_{s1})$) at the first rate;
a transient computation module that is configured to receive third inputs comprising: the first torque command signal $Te^*(kT_{s1})$, and second torque command signal $Te^*((k+1)T_{s1})$, wherein the transient computation module is configured to generate a difference signal comprising torque transient values ($\Delta Te^*$) each representing a difference between the second torque command signal $Te^*((k+1)T_{s1})$ and the first torque command signal $Te^*(kT_{s1})$;
a modified voltage command computation module that is configured to generate the modified d-axis voltage command signal ($Vd^*(kT_{s1}+mT_{s0})$) and the modified q-axis voltage command signal ($Vq^*(kT_{s1}+mT_{s0})$);
a voltage command selection module that is configured to receive the d-axis voltage command signal ($Vd^*(kT_{s1})$), and the q-axis voltage command signal ($Vq^*(kT_{s1})$); and
a transient testing module that is configured to compare each torque transient value ($\Delta Te^*$) to the transient threshold, and to generate:
 the first selection signal whenever one of the torque transient values ($\Delta Te^*$) is determined to be less than or equal to the transient threshold, wherein the first selection signal causes the voltage command selection module to output the d-axis voltage command signal ($Vd^*(kT_{s1})$), and the q-axis voltage command signal ($Vq^*(kT_{s1})$) as the synchronous reference frame voltage command signals;
 the second selection signal whenever one of the torque transient values ($\Delta Te^*$) is determined to be greater than the transient threshold, wherein the second selection signal causes the modified voltage command computation module to output the modified d-axis voltage command signal ($Vd^*(kT_{s1}+mT_{s0})$) and the modified q-axis voltage command signal ($Vq^*(kT_{s1}+mT_{s0})$) as the synchronous reference frame voltage command signals.

12. A system according to claim 11, further comprising:
a first set of current command lookup tables that are configured to receive the first inputs, and that are configured to generate the first d-axis current command signal ($Id^*(kT_{s1})$) of the ($Id^*$), and the first q-axis current command signal ($Iq^*(kT_{s1})$);
a second set of current command lookup tables that are configured to receive second inputs at the first rate comprising: the second torque command signal $Te^*((k+1)T_{s1})$, the angular rotation speed ($\omega r(kT_{s1})$), and the DC input voltage ($V_{DC}(kT_{s1})$), and that are configured to generate the second d-axis current command signal ($Id^*(k+1)T_{s1}$), and the second q-axis current command signal ($Iq^*(k+1)T_{s1}$).

13. A system according to claim 12, wherein the modified voltage command computation module is configured to: process the d-axis voltage command signal ($Vd^*(kT_{s1})$), the q-axis voltage command signal ($Vq^*(kT_{s1})$), the first d-axis current command signal ($Id^*(kT_{s1})$), the first q-axis current command signal ($Iq^*(kT_{s1})$), the second d-axis current command signal ($Id^*(k+1)T_{s1}$), the second q-axis current command signal ($Iq^*(k+1)T_{s1}$) to compute the modified d-axis voltage command signal ($Vd^*(kT_{s1}+mT_{s0})$) and the modified q-axis voltage command signal ($Vq^*(kT_{s1}+mT_{s0})$).

14. A system according to claim 13, wherein the second torque command signal $Te^*((k+1)T_{s1})$ is shifted by one first rate sampling time with respect to the first torque command signal $Te^*(kT_{s1})$, and wherein the second d-axis current command signal ($Id^*(k+1)T_{s1}$) is shifted by one first rate sampling time with respect to the first d-axis current command signal (Id*($kT_{s1}$)), and wherein the second q-axis current command signal (Iq*($(k+1)T_{s1}$)) is shifted by one first rate sampling time with respect to the first q-axis current command signal (Iq*($kT_{s1}$)).

15. A system according to claim 14, wherein the first rate corresponds to a relatively slower frequency processing, and wherein the second rate corresponds to a relatively higher frequency processing.

16. A system according to claim 15, wherein the first rate corresponds to a first period ($T_{s1}$) and wherein the second rate corresponds to a second period ($T_{s0}$), wherein there are multiple second periods during each first period.

17. A system according to claim 16, wherein the second rate is equal to a PWM rate or switching frequency ($f_{SW}$).

18. A system according to claim 16, wherein the modified voltage command computation module computes the modified d-axis voltage command signal (Vd*($kT_{s1}+mT_{s0}$)) and the modified q-axis voltage command signal (Vq*($kT_{s1}+mT_{s0}$)) multiple times at the second rate during one of the first periods ($T_{s1}$) to avoid large step changes in the pair of synchronous reference frame voltage command signals such that commanded torque is produced over time in a more linear fashion than the synchronous reference frame d-axis voltage command signal (Vd*($kT_{s1}$)) and the synchronous reference frame q-axis voltage command signal (Vq*).

19. A system according to claim 10, further comprising:
a synchronous-to-stationary transformation module configured to transform either (1) the synchronous reference frame d-axis voltage command signal (Vd*($kT_{s1}$)) and the synchronous reference frame q-axis voltage command signal (Vq*($kT_{s1}$)), or (2) the modified synchronous reference frame d-axis voltage command signal (Vd*($kT_{s1}+mT_{s0}$)), and the modified synchronous reference frame q-axis voltage command signal (Vq*($kT_{s1}+mT_{s0}$)) that are output from the voltage command processor module to generate an α-axis stationary reference frame voltage command signal (Vα*) and a β-axis stationary reference frame voltage command signal (Vβ*).

20. A method for generating a pair of synchronous reference frame voltage command signals for controlling a permanent magnet machine, the method comprising:

receiving first inputs comprising: a first torque command signal Te*($kT_{s1}$), an angular rotation speed (ωr($kT_{s1}$)) of (ωr), and a DC input voltage ($V_{DC}$($kT_{s1}$));

applying the first inputs to a set of voltage command lookup tables to generate a d-axis voltage command signal (Vd*($kT_{s1}$)) and a q-axis voltage command signal (Vq*($kT_{s1}$)), wherein the d-axis voltage command signal (Vd*($kT_{s1}$)) and the q-axis voltage command signal (Vq*($kT_{s1}$)) are updated at a first rate that corresponds to a first period ($T_{s1}$);

computing torque transient values (ΔTe*) each representing a difference between a second torque command signal Te*($(k+1)T_{s1}$) and the first torque command signal Te*($kT_{s1}$), and comparing the torque transient values (ΔTe*) to a transient threshold;

generating a first selection signal whenever one of the torque transient values (ΔTe*) is determined to be less than or equal to the transient threshold; and in response to the first selection signal, outputting the d-axis voltage command signal (Vd*($kT_{s1}$)) and the q-axis voltage command signal (Vq*($kT_{s1}$));

generating a second selection signal whenever one of the torque transient values (ΔTe*) is determined to be greater than the transient threshold; and in response to the second selection signal, computing, based on second inputs, a modified d-axis voltage command signal (Vd*($kT_{s1}+mT_{s0}$)) and a modified q-axis voltage command signal (Vq*($kT_{s1}+mT_{s0}$)), wherein the modified d-axis voltage command signal (Vd*($kT_{s1}+mT_{s0}$)) and the modified q-axis voltage command signal (Vq*($kT_{s1}+mT_{s0}$)) are computed as a function of and updated at both the first rate and a second rate that corresponds to a second period ($T_{s0}$), wherein there are multiple second periods during each first period such that multiple values of the modified d-axis voltage command signal (Vd*($kT_{s1}+mT_{s0}$)) and multiple values of the modified q-axis voltage command signal (Vq*($kT_{s1}+mT_{s0}$)) are computed during each of the first periods ($T_{s1}$).

* * * * *